United States Patent
Bouazizi et al.

(10) Patent No.: US 10,116,921 B2
(45) Date of Patent: Oct. 30, 2018

(54) METHOD FOR PROVIDING A MULTIMEDIA MESSAGE SERVICE

(71) Applicant: Huawei Technologies Co., Ltd., Shenzhen (CN)

(72) Inventors: Imed Bouazizi, Munich (DE); Giovanni Cordara, Munich (DE); Lukasz Kondrad, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 364 days.

(21) Appl. No.: 14/616,315

(22) Filed: Feb. 6, 2015

(65) Prior Publication Data

US 2015/0201179 A1    Jul. 16, 2015

Related U.S. Application Data

(63) Continuation of application No. PCT/EP2012/065374, filed on Aug. 6, 2012.

(51) Int. Cl.
*H04N 13/00* (2018.01)
*H04N 13/161* (2018.01)
(Continued)

(52) U.S. Cl.
CPC ....... *H04N 13/161* (2018.05); *H04L 65/4092* (2013.01); *H04N 13/0029* (2013.01);
(Continued)

(58) Field of Classification Search
CPC ...... H04L 65/4092; H04W 4/12; H04W 4/18; H04W 8/24; H04N 13/0029; H04N 13/0048; H04N 2213/007
See application file for complete search history.

(56) References Cited

U.S. PATENT DOCUMENTS

| | | | |
|---|---|---|---|
| 2004/0148400 A1 | 7/2004 | Mostafa | |
| 2006/0031369 A1* | 2/2006 | Caron | H04L 51/14 709/207 |

(Continued)

FOREIGN PATENT DOCUMENTS

| | | |
|---|---|---|
| CN | 1711786 A | 12/2005 |
| CN | 102365869 A | 2/2012 |

(Continued)

OTHER PUBLICATIONS

"Series H: Audiovisual and Multimedia Systems; Infrastructure of Audiovisual Services—Coding of Moving Video; Advanced Video Coding for Generic Audiovisual Services," Recommendation ITU-T H.264, pp. i-657, International Telecommunication Union, Geneva, Switzerland (Jan. 2012).

(Continued)

*Primary Examiner* — Sathyanaraya V Perungavoor
*Assistant Examiner* — Peet Dhillon
(74) *Attorney, Agent, or Firm* — Leydig, Voit & Mayer, Ltd.

(57) ABSTRACT

The disclosure relates to a method for providing a multimedia message service from a server or relay to a user agent in a multimedia network, the method comprising: determining a video content characteristic of a video content by the server or relay; determining display and/or decoding capabilities of the user agent; signaling options of the video content to the user agent; and providing the video content depending on the display and/or decoding capabilities and depending on an option selected via the user agent from the signaled options of the video content.

23 Claims, 10 Drawing Sheets

(51) Int. Cl.
| | |
|---|---|
| H04N 13/139 | (2018.01) |
| H04L 29/06 | (2006.01) |
| H04W 4/12 | (2009.01) |
| H04W 4/18 | (2009.01) |
| H04W 8/24 | (2009.01) |

(52) U.S. Cl.
CPC ....... *H04N 13/0048* (2013.01); *H04N 13/139* (2018.05); *H04W 4/12* (2013.01); *H04W 4/18* (2013.01); *H04W 8/24* (2013.01); *H04N 2213/007* (2013.01)

(56) References Cited

U.S. PATENT DOCUMENTS

| | | | | |
|---|---|---|---|---|
| 2009/0029723 | A1* | 1/2009 | Doyle | H04L 29/06027 455/466 |
| 2011/0007898 | A1* | 1/2011 | Meyer | H04L 12/189 380/255 |
| 2011/0286530 | A1* | 11/2011 | Tian | H04N 21/2365 375/240.25 |
| 2012/0259946 | A1* | 10/2012 | Stockhammer | H04L 65/105 709/217 |
| 2013/0019024 | A1* | 1/2013 | Sheth | H04N 21/2381 709/231 |
| 2014/0040959 | A1* | 2/2014 | Oyman | H04N 21/6131 725/62 |

FOREIGN PATENT DOCUMENTS

| | | | | |
|---|---|---|---|---|
| WO | WO 0243414 | A2 | 5/2002 | |
| WO | WO 2004045230 | A1 * | 5/2004 | ....... H04L 29/06027 |

OTHER PUBLICATIONS

Gellens et al., "The 'Codecs' and 'Profiles' Parameters for "Bucket" Media Types," Internet Engineering Task Force, Request for Comments: 6381, pp. 1-19, IETF Trust, Fremont, California (Aug. 2011).

Fielding et al., "Hypertext Transfer Protocol—HTTP/1.1," Network Working Group, Request for Comments: 2616, pp. 1-176, Internet Society, Reston, Virginia (Jun. 1999).

Troost et al., "Communicating Presentation Information in Internet Messages: The Content-Disposition Header Field," Network Working Group, Request for Comments: 2183, pp. 1-12 (Aug. 1997).

"Mobile 3D Video: Proposed Specification Text for MVC in MMS," 3GPP TSG-SA4 #S4-69, Erlangen, Germany, S4-120668, 3$^{rd}$ Generation Partnership Project, Valbonne, France (May 21-25, 2012).

"3$^{rd}$ Generation Partnership Project; Technical Specification Group Services and System Aspects; Transparent End-to-End Packet-Switched Streaming Service (PSS); Protocols and Codecs (Release 11)," 3GPP TS 26.234, V11.0.0, pp. 1-169, 3$^{rd}$ Generation Partnership Project, Valbonne, France (Mar. 2012).

Palme et al., "MIME Encapsulation of Aggregate Documents, such as HTML (MHTML)," Network Working Group, Request for Comments: 2557, pp. 1-28, Internet Society, Reston, Virginia (Mar. 1999).

"Device Capability Exchange Signaling of Supported 3D Video Codecs and Formats," 3GPP TSG-SA4 Meeting #68, Kyoto, Japan, S4-120511, 3$^{rd}$ Generation Partnership Project, Valbonne, France (Apr. 16-20, 2012).

"User Agent Profile," pp. 1-46, Version 2.0, Open Mobile Alliance, San Diego, California (Feb. 6, 2006).

"MMS Conformance Document," pp. 1-79, Version 1.3, Open Mobile Alliance, San Diego, California (Sep. 13, 2011).

"3$^{rd}$ Generation Partnership Project; Technical Specification Group Core Network and Terminals; Multimedia Messaging Service (MMS); Functional Description; Stage 2 (Release 6)," 3GPP TS 23.140, V6.16.0, pp. 1-224, 3$^{rd}$ Generation Partnership Project, Valbonne, France (Mar. 2009).

Freed et al., "Multipurpose Internet Mail Extensions (MIME) Part Two: Media Types," Network Working Group, Request for Comments: 2046, pp. 1-44 (Nov. 1996).

"3$^{rd}$ Generation Partnership Project; Technical Specification Group Services and System Aspects; Mobile Stereoscopic 3D Video (Release 11)," 3GPP TR 26.905, V11.0.0, pp. 1-56, 3$^{rd}$ Generation Partnership Project, Valbonne, France (Jun. 2012).

"3$^{rd}$ Generation Partnership Project; Technical Specification Group Services and System Aspects; Multimedia Messaging Service (MMS); Media Formats and Codecs (Release 11)," 3GPP TS 26.140, V11.0.0, pp. 1-13, 3$^{rd}$ Generation Partnership Project, Valbonne, France (Mar. 2012).

"3$^{rd}$ Generation Partnership Project; Technical Specification Group Services and System Aspects; Transparent End-to-End Packet-Switched Streaming Service (PSS); 3GPP SMIL Language Profile (Release 10)," 3GPP TS 26.246, V10.0.0, pp. 1-17, 3$^{rd}$ Generation Partnership Project, Valbonne, France (Mar. 2011).

"Synchronized Multimedia Integration Language (SMIL 2.0)—[Second Edition]," W3C Recommendation, World Wide Web Consortium (Jan. 7, 2005).

* cited by examiner

```
presentation :=  " presentation " "=" presentation-type
presentation-type := "side-by-side"
                   / "top-bottom"              301
                   / "time-interleaved"        302
                   / extension-token           303
                   ; values are not case-sensitive
```

```
Content-Type: multipart/related;
         start=<fco9836sms@sms.domain.com>;
         boundary="boundary123456789";
         type=application/smil
--boundaryq123456789
Content-ID: <fco9836sms@sms.domain.com>
Content-Type: application/smil; charset="US-ASCII"
[...]
--boundary123456789
Content-ID: <fco1345sms@sms.domain.com>                    401
Content-Location: bundled/ video.mp4
Content-Type: video/mp4; codecs="avc1.640028"; presentation="side-by-side"
[...]
--boundary123456789-
Content-ID: <fco2794sms@sms.domain.com>
Content-Location: bundled/audio.AMR
Content-Type: audio/AMR
[...]
--boundary123456789
Content-ID: <fco2349sms@sms.domain.com>
Content-Location: bundled/description.txt
Content-Type: text/plain
[...]
--boundary123456789-
```

```
Attribute name:            3DRenderingSupport
Attribute definition:      The 3D rendering support on the device.
Component:                 PssCommon
Type:                      Literal (Bag)
Legal values:              "side-by-side",    "top-bottom",    "time-
interleaved"
Resolution rule:                   Append
EXAMPLE:                   <3DRenderingSupport>
                              <rdf:Bag>
                                 <rdf:li> side-by-side </rdf:li>
                                 <rdf:li> time-interleaved </rdf:li>
                              </rdf:Bag>
                           </3DRenderingSupport>
```

Content-Type: multipart/related; boundary="boundary-example";
              type="text/html"
--boundary-example
Content-Type: text/html; charset="US-ASCII"
601  ... ... <IMG SRC="fiction1/fiction2"> ... ...
     ... ... <IMG SRC="cid:971169928lxyz@foo.bar.net"> ... ...
--boundary-example
Content-Type: image/gif
602  Content-ID: <971169825lxyz@foo.bar.net>
     Content-Location: fiction1/fiction2
--boundary-example
Content-Type: image/gif
603  Content-ID: <971169838lxyz@foo.bar.net>
     Content-Location: fiction1/fiction3
MIME Encapsulation15
--boundary-example--
```

```
<smil>
    <head>
        <meta name="title" content="Example" />
        <meta name="author" content="Smil Example" />
        <layout>
701         <root-layout width="320" height="320"/>
            <region id="Video" width="130%" height="240" left="0" top="0" />
            <region id="Text" width="130%" height="40" left="0" top="250" />
        </layout>
    </head>
    <body>
703     <par dur="8s">
            <video src="video.mp4" region="Video" />
            <text src="text.txt" region="Text" />
            <audio src="audio.amr"/>
        </par>
    </body>
</smil>
```

METHOD FOR PROVIDING A MULTIMEDIA MESSAGE SERVICE

CROSS-REFERENCE TO RELATED APPLICATION

This application is a continuation of International Patent Application No. PCT/EP2012/065374, filed on Aug. 6, 2012, which is hereby incorporated by reference in its entirety.

BACKGROUND

The present invention relates to a method for providing a multimedia message service from a server or relay to a user agent in a multimedia network, in particular a method for providing a multimedia message service (MMS) from an MMS Server/Relay B to an MMS User Agent B according to a 3GPP (Third Generation Partnership Project) Multimedia Message Service specification.

Depth perception is the visual ability to perceive the world in three dimensions (3D) and the distance of an object. Stereoscopic 3D video refers to a technique for creating the illusion of depth in a scene by presenting two offset images of the scene separately to the left and right eye of the viewer. Stereoscopic 3D video conveys the 3D perception of the scene by capturing the scene via two separate cameras, which results in objects of the scene being projected to different locations in the left and right images.

By capturing the scene via more than two separate cameras a multi-view 3D video is created. Depending on the chosen pair of the captured images, different perspectives (views) of the scene can be presented. Multi-view 3D video allows a viewer to interactively control the viewpoint. Multi-view 3D video can be seen as a multiplex of number of stereoscopic 3D videos representing the same scene from different perspectives.

The displacement of a pixel (an object) from the right view to the left view is called disparity. The value of disparity defines the perceived depth. As an example, when a disparity is equal 0 then the related pixel (object) is perceived at the image plane (i.e. screen), with negative disparity the related pixel (object) is perceived to appear to the viewer in front of the screen and with positive disparity the related pixel (object) is perceived to appear to the viewer behind the screen.

The frame-compatible packing format consists in sub-sampling the two views which compose a stereoscopic 3D video and pack them together in order to produce a video signal compatible with a 2D frame infrastructure.

In a typical operation mode, the two stereoscopic frames related to the same time are packed into a spatial arrangement having the same resolution of a 2D compatible view. The spatial packing arrangement typically uses a side-by-side or top-bottom format where the down-sampling process is applied to each view: in this way, each view presents spatial resolution which is halved with respect to the one supported by the corresponding 2D view.

In order to avoid the lack of definition introduced by the frame-compatible packing formats, it is possible to transmit both views at full resolution. The most common format is the frame packing for which the left and right views are temporally interleaved. In this way, the two views have resolution doubled compared to the corresponding frame compatible packing format.

In frame-compatible stereoscopic video, the spatial packing of a stereo pair into a single frame is performed at the encoder side and the so obtained frames are encoded as a single view. The output frames produced by the decoder contain constituent frames of a stereo pair. The encoder side indicates the used frame packing format by specifying the frame packing arrangement in the Supplemental Enhancement Information (SEI) messages as specified in the H.264/AVC standard and are conveyed inside the 3D video H.264/AVC encoded bitstream. The SEI messages about the frame packing format are therefore extracted and parsed during the decoding process of the 3D video bitstream. The decoder side decodes the frame conventionally, unpacks the two constituent frames from the output frames of the decoder, performs up-sampling in order to revert the encoder side down-sampling process and renders the constituent frames on the 3D display.

In temporal interleaving, the video is encoded at double the frame rate of the original video. Each pair of subsequent pictures constitutes a stereo pair (left and right view). The encoder side indicates the used temporal interleaving format using the Supplemental Enhancement Information (SEI) messages as specified in the H.264/AVC standard and conveys them inside the 3D video H.264/AVC encoded bitstream. The SEI messages about the frame packing format are therefore extracted and parsed during the decoding process of the 3D video bitstream. The rendering of the time-interleaved stereoscopic video is typically performed at the high frame rate, where active (shutter) glasses are used to blind the incorrect view at each eye. This requires accurate synchronization between the glasses and the screen.

Multi-view Video Coding (MVC) was standardized as an extension (annex) to the H.264/AVC standard. In MVC, the views from different cameras are encoded into a single bitstream that is backwards compatible with single-view H.264/AVC. One of the views is encoded as "base view". A single-view H.264/AVC decoder can decode and output the base view of an MVC bitstream at different profiles (e.g. constrained baseline or progressive high profile). MVC introduces inter-view prediction between views. MVC is able to compress stereoscopic video in a backwards compatible manner without compromising the view resolutions. If the server is aware of the User Equipment (UE) capabilities, it can omit sending the view components of the non-base view to a device that does not support 3D or does not have enough bitrate to deliver both views.

Figure 6:
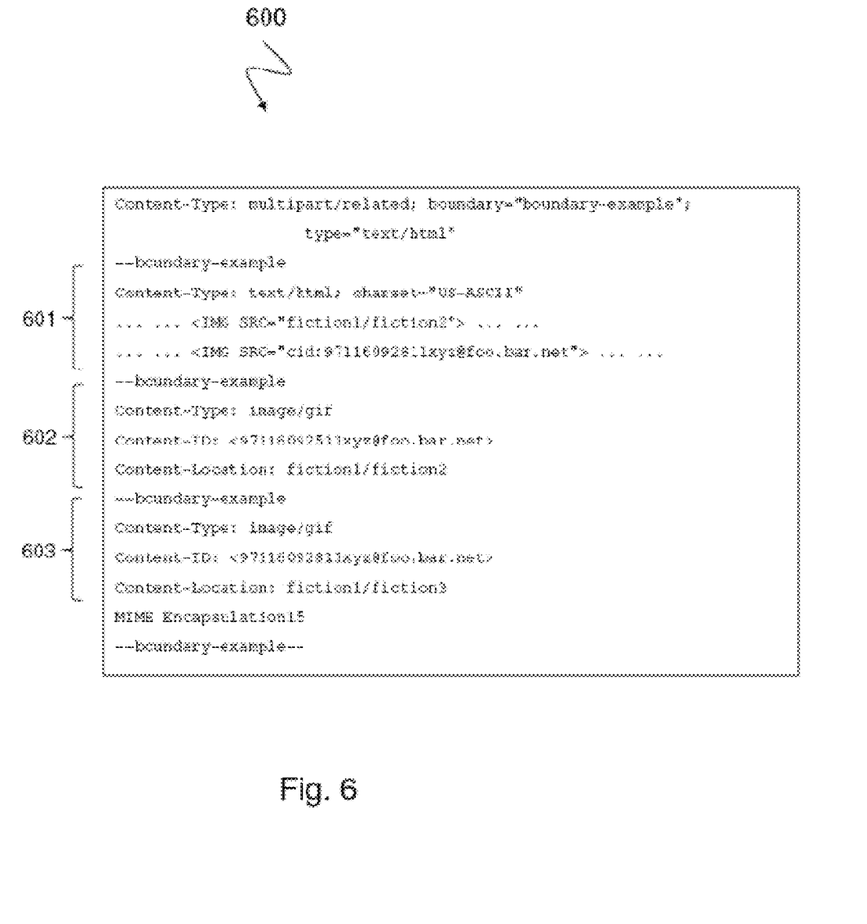
FIG. 6 shows a schematic diagram of a conventional MIME (multipart internet mail extensions) encapsulated message.

MIME is a standard originally developed for including content in email messages in addition to the plain text body of the email. MIME can be used to bundle separate files together. An extension to MIME known as "MIME Encapsulation of Aggregate Documents" according to RFC 2557 "MIME Encapsulation of Aggregate Documents." allows to indicate to a client that all of the parts of the message are related to one another and may refer to one another. An example of a MIME encapsulated message 600 as specified in RFC 2557 is illustrated in FIG. 6.

The <Content-Type> indicates to the receiving client that the separate parts of the message are related and may refer to one another. The <boundary> common to all multipart messages indicates to the client what string will separate each of the parts of the message. Between each of the boundaries are the messages 601, 602, 603 themselves. Each message 601, 602, 603 also contains <Content-Type> describing the type of the message. The first message 601 shows only excerpts from the HTML. The second 602 and third 603 messages omit the actual bodies of the images and just show the information relevant to their aggregation in a multipart/related message.

HTML message can refer to an included image by either its specified <Content-ID> (cid) or <Content-Location>. These are both ways of identifying parts of the message uniquely so that other parts of the message can refer to them.

A client reading the example HTML that knows the HTML is part of a multipart/related message that looks first within the message parts for that URL before looking to the network.

UAProf according to "User Agent Profile version 2.0", Open Mobile Alliance™ is an Open Mobile Alliance (OMA) specification dealing with representation and end-to-end flow of terminal capabilities and preference information (CPI). UAProf uses the framework defined by the World Wide Web Consortium's (W3C's) Composite Capability/Preferences Profile (CC/PP) to represent capabilities and preference information (CPI) and is defined using the Resource Description Framework (RDF) schema and vocabulary. The specification also provides details of how the information should be transmitted to servers using the Wireless Session Protocol (WSP) and the Hypertext Transfer Protocol (HTTP). UAProf is partitioned in the following categories of descriptors: hardware platform, software platform, browser user agent, network characteristics, and Wireless Application Protocol (WAP) characteristics. The terminal's UAProf description may provide URLs where CPI can be retrieved on the Web or may explicitly provide them. This first option is referred to as static UAProf and allows significant reduction of the bandwidth required to transmit CPI. The second option, referred to as dynamic UAProf, allows dynamic capabilities to be sent (e.g. changing network conditions).

The server is responsible for resolving UAProf information. This feature makes dynamic UAProf rather complex to implement on both terminals and servers. For instance, on the terminal side, static UAProf implementation only requires the terminal to transmit a constant string representing its capabilities or, more often, URL(s) where the server can retrieve them. Such a string can be hardwired in the terminal. In contrast, dynamic UAProf would require the terminal to monitor changes in its capabilities (e.g. new software installed providing new MIME types support), and generate, track and send differences from a reference profile to the server. This explains why most manufacturers at present have decided to support only static UAProf.

The use of RDF enables an extensibility mechanism for CC/PP-based schemes that addresses the evolution of new types of devices and applications. The 3GPP PSS base vocabulary is an extension to UAProf and is defined as an RDF schema. A device capability profile in 3GPP is an RDF document that follows the structure of the CC/PP framework and the CC/PP application UAProf. Attributes are used to specify device capabilities and preferences. A set of attribute names, permissible values and semantics constitute a CC/PP vocabulary, which is defined by an RDF schema. For PSS, the UAProf vocabulary is reused and an additional PSS specific vocabulary is defined. The syntax of the attributes is defined in the vocabulary schema, but also, to some extent, the semantics. A PSS device capability profile is an instance of the schema (UAProf and/or the PSS specific schema).

Synchronized Multimedia Integration Language (SMIL) according to "http://www.w3.org/TR/2005/REC-SMIL2-20050107/ "defines an XML-based language aiming at describing interactive multimedia presentations. Using SMIL, the temporal behavior of a multimedia presentation, associate hyperlinks with media objects, and the layout of the presentation on a screen can be described.

SMIL is defined as a set of markup modules, which define the semantics and XML syntax for certain areas of SMIL functionality. SMIL defines ten modules: Animation Modules, Content Control Modules, Layout Modules, Linking Modules, Media Object Modules, Meta information Module, Structure Module, Timing and Synchronization Modules, Time Manipulations Module and Transition Effects Modules.

The 3rd Generation Partnership Project (3GPP) defined a 3GPP SMIL Language Profile in 3GPP TS 26.246: "Transparent end-to-end packet switched streaming service (PSS); 3GPP SMIL Language Profile", also referred to as "3GPP PSS SMIL Language Profile" or just "3GPP SMIL". The 3GPP SMIL Language Profile is based on SMIL 2.0 Basic Profile according to "http://www.w3.org/TR/2005/REC-SMIL2-20050107/".

3GPP Multimedia Messaging Service (MMS) specifies a set of requirements enabling the provision of non-real time multimedia messaging service, seen primarily from the subscriber's and service providers' points of view. 3GPP MMS allows non real-time transmissions for different types of media including such functionality as: multiple media elements per single message, individual handling of message elements, different delivery methods for each message element, negotiating different terminal and network Multimedia Message (MM) capabilities, notification and acknowledgement of MM related events and personalized MMS configuration.

Figure 7:
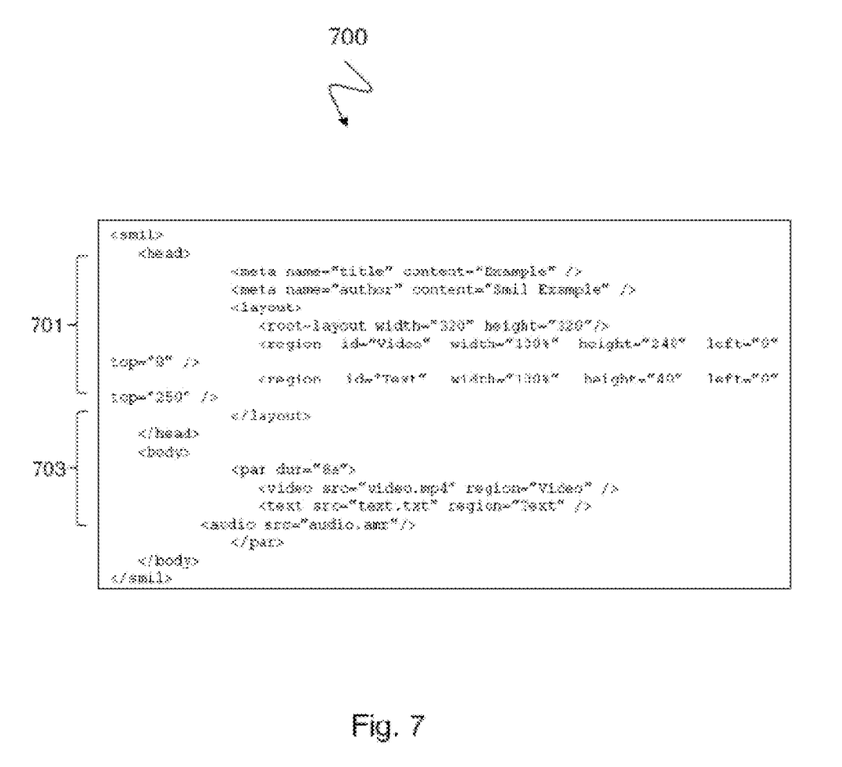
FIG. 7 shows a schematic diagram of a conventional SMIL (synchronized multimedia integration language) message.

Thus 3GPP MMS enables a unified application which integrates the composition, storage, access, and delivery of different kinds of media, e.g. text, voice, image or video in combination with additional mobile requirements. The 3GPP MMS uses 3GPP SMIL Language Profile according to 3GPP TS 26.246: "Transparent end-to-end packet switched streaming service (PSS); 3GPP SMIL Language Profile" for media synchronization and scene description. FIG. 7 shows a schematic diagram of synchronized multimedia integration language (SMIL) 700 for an MMS message.

The SMIL message body 703 is enclosed in <smil></smil> tags and the document contains head 701 and body 703 sections. The head section 701 contains information that applies to the entire message. The meta fields such as "title" and "author" are not mandatory. The layout section <layout ></ layout> within the head section 701 specifies the master layout for all the slides in the message. In the example depicted in FIG. 7, the slide will be displayed 160 pixels wide and 120 pixels high. The layout, in the example of FIG. 7, is further divided into two smaller regions, "Image" (or "Video") and "Text". The body section 703 describes the actual slides in the message. These slides are denoted with the <par> tag. All the elements within this tag are to be displayed simultaneously. The <dur> attribute for each slide is the duration of the slide in the slide show. In the example of FIG. 7, each slide contains three elements: one for being displayed in the image (or video) region, one for being displayed in the text region and an audio element that will be played when the slide is viewed.

The MMS network architecture 800 according to 3GPP TS 23.140: "Multimedia Messaging Service (MMS); Functional description; Stage 2" which consists of all the elements required for providing a complete MMS to a user is shown in FIG. 8.

Figure 8:
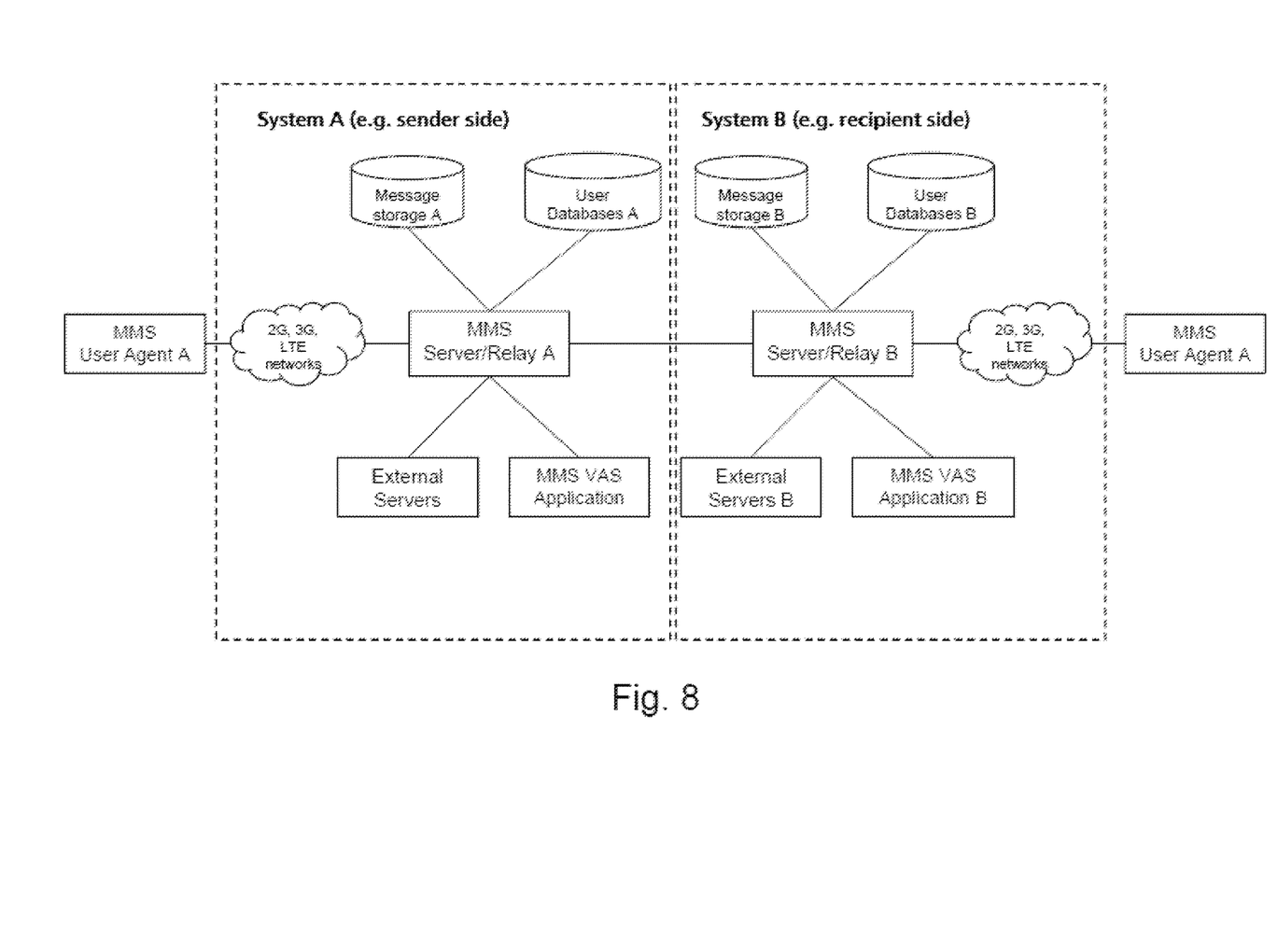
FIG. 8 shows a block diagram of a conventional MMS architecture according to technical specification 3GPP TS 23.140.

If MMS User Agent A 811 and MMS User Agent B 831 belong to the same network then the System A 801 and System B 803 components presented in FIG. 8 can be the same entities. At the heart of 3GPP MMS architecture 800 the MMS Relay/Server 815 is located. The MMS Relay/

Server 815, among others, may provide the following functionalities according to 3GPP TS 23.140: "Multimedia Messaging Service (MMS); Functional description; Stage 2": receiving and sending multimedia messages (MM); MM notification to the MMS User Agent 811; temporary storage 817 of messages; negotiation of terminal capabilities; transport of application data; personalizing MMS based on user profile information; MM deletion based on user profile or filtering information; media type conversion; and media format conversion.

The MMS User Agent (UA) 811 resides on user equipment (UE) or on an external device connected to a UE. It is an application layer function that provides the users with the ability to view, compose and handle MMs (e.g. submitting, receiving, deleting of MMs).

The MMS Value Added Service (VAS) Applications 823 offer Value Added Services to MMS users. There could be several MMS VAS Applications 823 included in or connected to MMS architecture 800.

MMS User Databases 819 element may be comprised of one or more entities that contain user related information such as subscription and configuration (e.g. UAProf).

Figure 9:
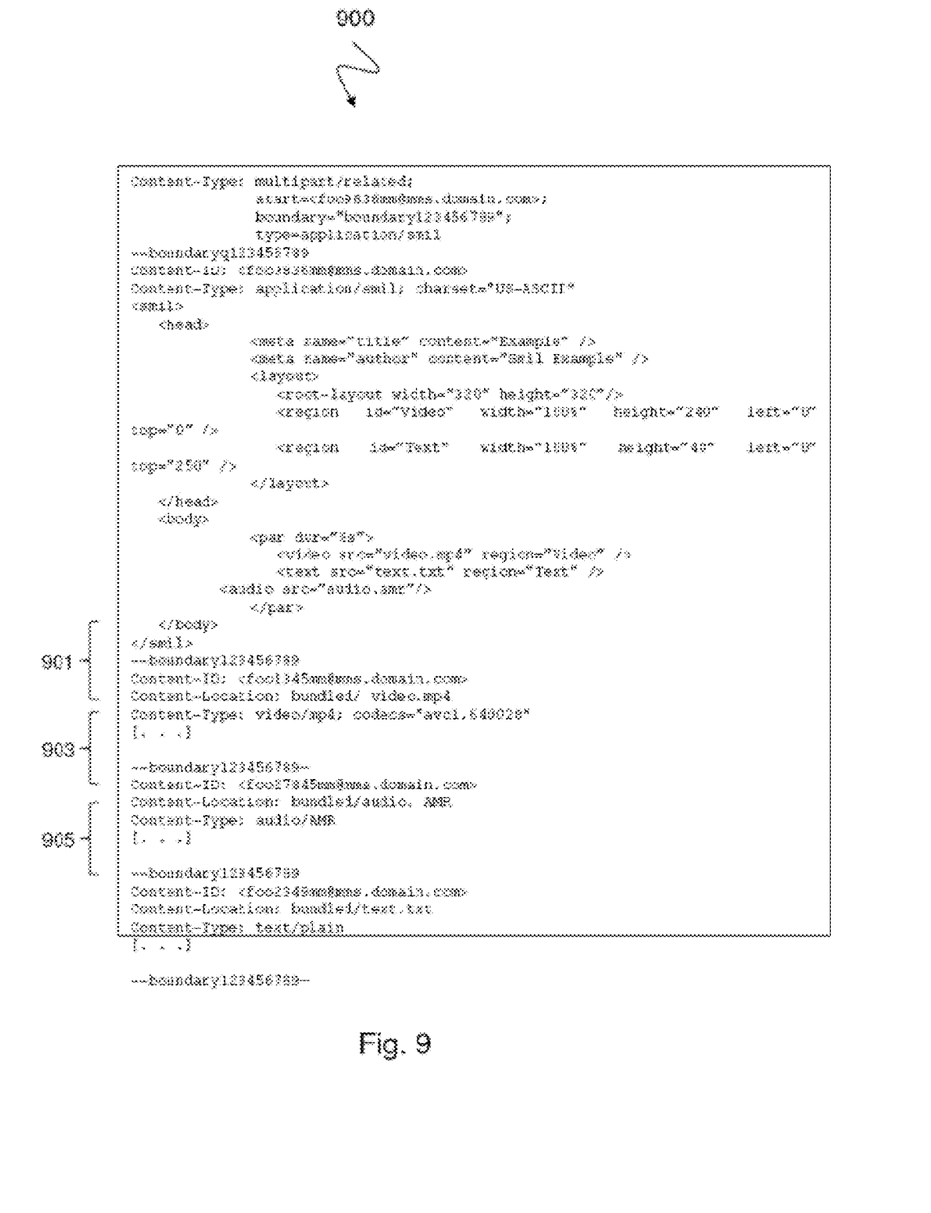
FIG. 9 shows a block diagram of a conventional multimedia message according to 3GPP specification.

An MMS User Agent A 811 depicted in FIG. 8 sends a multimedia message 900 as illustrated in FIG. 9 by submitting the message 900 to its home MMS Server/Relay A 815. Multiple media elements shall be combined into a composite single MM using MIME multipart format as defined in IETF RFC 2046: "Multipurpose Internet Mail Extensions (MIME) Part Two: Media Types". The media type of a single MM element shall be identified by its appropriate MIME type whereas the media format shall be indicated by its appropriate MIME subtype. A message must have the address of the recipient and a MIME content type. Several other parameters may be set for a message including the desired time of expiry for the message and the message priority. Upon reception of a message 900, the recipient home MMS Server/Relay B 835 assigns message identification to the message 900. MMS Server/Relay B 835 may also store a copy of the message 900, then routes the message 900 towards the recipient, MMS User Agent B 831. FIG. 9 is an example of a multipart MIME used to transmit MMS from MMS User Agent A 811 to MMS Server/Relay A 815. The message 900 comprises video content 901, audio content 903 and text content 905.

Figure 10:
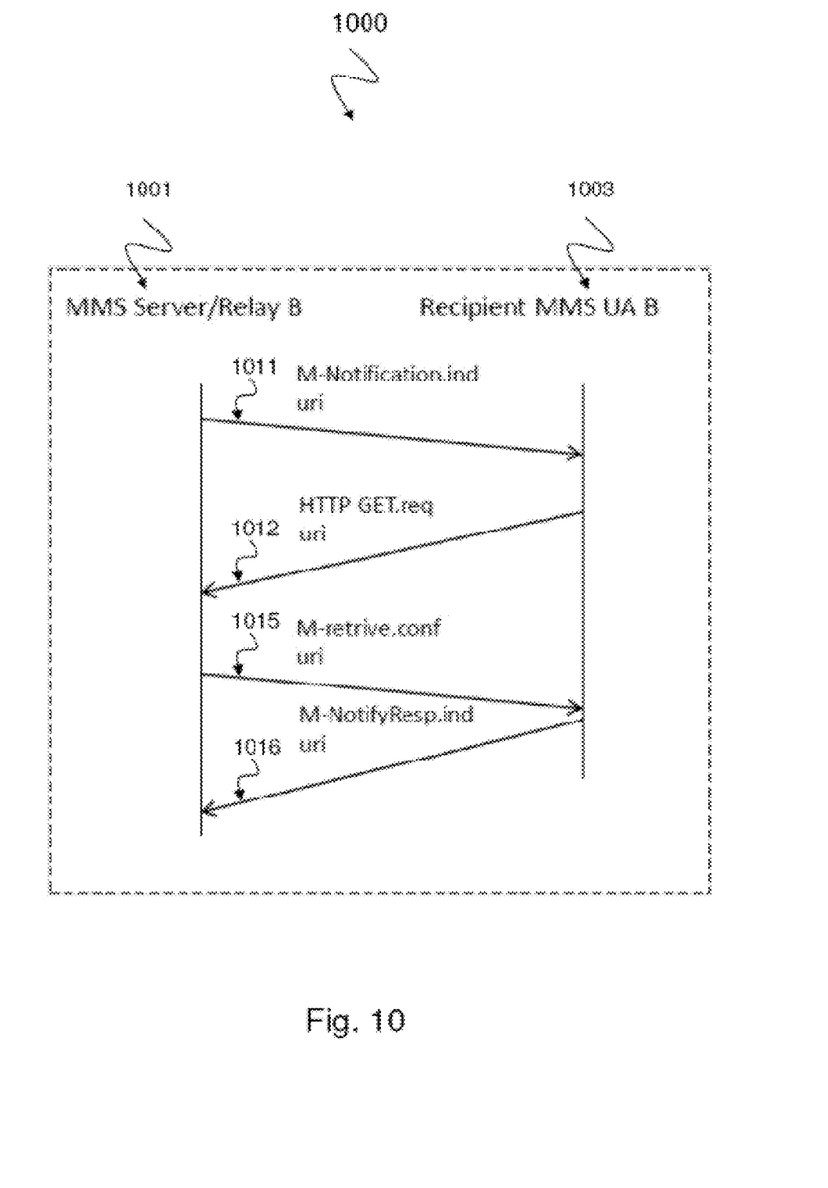
FIG. 10 shows a message sequence diagram between an MMS Server/Relay B and an MMS User Agent B according to technical specification 3GPP TS 23.140.

FIG. 10 shows a message sequence diagram between an MMS Server/Relay B 1001 corresponding to the MMS Server/Relay B 835 depicted in FIG. 8 and an MMS User Agent B 1003 corresponding to the MMS User Agent B 831 depicted in FIG. 8 according to the technical specification 3GPP TS 23.140. Upon reception of a message such as a message 900 depicted in FIG. 9, the recipient MMS Server/Relay B 1001 verifies the recipient's (MMS User Agent B 1003) profile (UAProf) and generates a notification to the recipient MMS User Agent B 1003, M-Notification.ind 1011. It also stores the message at least until one of the following events happens: the associated time of expiry is reached, the message is delivered, the recipient MMS User Agent B 1003 requests the message to be forwarded, the message is rejected. When the recipient MMS User Agent B 1003 receives a notification 1011, it uses the message reference (Uniform Resource Identifier, URI) in the notification 1011 to reject or retrieve the message, either immediately or at a later time, either manually or automatically, as determined by the operator configuration and the user profile. The MMS is retrieved using HTTP GET request message 1012 with the signaled URI.

Within a request for delivery of a message 1012, the recipient MMS User Agent B 1003 can indicate its capabilities, e.g. a list of supported media types and media formats indicating its UAProf, for the recipient MMS Server/Relay B 1001. When a delivery request 1012 is received, the recipient MMS Server/Relay B 1001 uses the information about the capabilities of the recipient MMS User Agent B 1003 to prepare the message for delivery to the recipient MMS User Agent B 1003. This preparation may involve the deletion or adaptation of unsupported media types and media formats. MMS Server/Relay B 1001 can also perform content adaptation based on the capabilities indicated by UAProf information of a recipient device, MMS User Agent B 1003, stored in the network.

In OMA-TS-MMS-CONF-V1_3-20110913-A, "MMS Conformance Document", Open Mobile Alliance™, the issues that need to be addressed in order to ensure interoperability of MMS functionalities between terminals produced by different manufacturers are identified. According to the document, MMS User Agent 1003 shall support UAProf according to "User Agent Profile version 2.0", Open Mobile Alliance™ for MMS User Agent capability negotiation. Similarly, MMS Server/Relay 1001 shall support UAProf for MMS User Agent capability negotiation.

Interoperability is essential for user experience and the success of the service. When sending messages, users expect the message to reach its destination and to be properly presented. Otherwise, users stop using the service because they do not trust it. Operators demand interoperability since they should not charge for a MM if it cannot be delivered and presented in a reasonably acceptable way to the recipient.

Currently, MMS Server/Relay B 1001 performs content adaptation based solely on the MMS recipient's UAProf information, without consulting with the device/user according to the message sequence depicted in FIG. 10. In this situation, a scenario where a device that does not support 3D but is connected to an external 3D display, and as such is able to display the 3D video correctly, is not able to receive 3D video content of MMS. This situation is due to a reason that the external device is not included in the UAProf information of the device and MMS Server/Relay B 1001 is always performing content adaptation and converts an MMS 3D content to a 2D content. Similarly, the opposite situation, where a 3D capable device which wants to limit the used bandwidth, for example, and thus downloads only 2D version of MMS, is also not possible.

As mentioned above, 3D video can be coded in various coding formats. Frame compatible H.264/AVC and temporally interleaved H.264/AVC use the traditional AVC file format where information about the stereo arrangement is carried in an SEI message inside the encoded 3D video bitstream. Due to this, MMS Server/Relay B performs additional processing on the encoded bitstream, i.e., decode the bitstream to extract the information about the 3D video content of the MMS in order to perform appropriate content adaptation. Multiview video coding H.264/MVC, on the other hand, uses extensions of the AVC file format and separate signaling in metadata, i.e. outside the encoded 3D video bitstream. Consequently, MMS Server/Relay B does not have to perform additional decoding to extract information and in the same way as in case of H.264/AVC encoded 3D video content, the additional complexity is reduced.

Delivering 3D video in frame compatible or temporally interleaved frame packing format using the current version of the 3GPP MMS specification ensures that a UE will be able to decode the bitstreams correctly, provided that it has the corresponding decoding capability. However, the specification does not ensure that a UE renders the 3D video correctly. For instance, a UE which is not aware of the SEI message indicating that a bitstream represents frame compatible 3D or temporally interleaved 3D simply renders the video frames as one 2D frame with two side-by-side (top-bottom) views or consecutive 2D frames representing two separate views of 3D video. This consequently leads to a degraded user experience. Currently, neither UAProf nor the device capability profile in 3GPP as mentioned above provide information about 3D rendering capabilities of a device, i.e. about frame packing formats supported by a device. As consequence, an MMS Server/Relay B does not have the full information to perform proper content adaptation and to ensure device interoperability.

SUMMARY

It is an object of the disclosure to improve interoperability of a user equipment in a network delivering 3D video, in particular in a network according to the 3GPP MMS specification.

This object is achieved by the features of the independent claims. Further implementation forms are apparent from the dependent claims, the description and the figures.

The disclosure is based on the finding that by using a new method for delivery of 3GPP Multimedia Message Service, in particular a new signaling between the MMS Server/Relay B and the MMS User Agent B interoperability is improved. This new method is based on providing multiple alternative choices or options of the MMS 3D content, e.g. 2D, 3D, both, etc. by the MMS Server/Relay B to MMS User Agent B before the content adaptation is performed. Due to this new method, the content adaptation is not restricted to the UAProf information but also takes into account the end user preferences. Moreover, by applying new signaling information about the post-decoder requirements of 3D video content included in an MMS, interoperability is improved. The signaling information is transported in metadata, that is, outside the 3D video encoded bitstream. Due to the additional information, a number of multimedia message (MM) adaptation mechanisms for solving the 3D MMS interoperability problems can be introduced on the MMS Server/Relay B or recipient MMS User Agent B, thereby improving interoperability of the user equipment with the network. Further, new vocabulary to the UAProf, i.e., extension of the PSS vocabulary allows MMS Server/Relay B to correctly perform content adaptation to the appropriate post-decoder capabilities of a 3D capable device.

By applying such methods for the delivery of a 3GPP Multimedia Message Service as will be presented in the following, the interoperability is significantly improved.

In order to describe the disclosure in detail, the following terms, abbreviations and notations will be used:
3D: three Dimensions,
MM: Multimedia Message,
MMS: Multimedia Message Service,
AVC: Advanced Video Coding,
SEI: Supplemental Enhancement Information,
MVC: Multi-view Video Coding,
UE: User Equipment,
MIME: Multipurpose Internet Mail Extensions according to RFC 2046,
HTML: Hypertext Markup Language,
UAProf: User Agent Profile,
OMA: Open Mobile Alliance,
CPI: Capabilities and Preference Information,
W3C: World Wide Web Consortium,
CC/PP: Composite Capability/Preferences Profile,
RDF: Resource Description Framework,
WSP: Wireless Session Protocol,
HTTP: Hypertext Transfer Protocol,
WAP: Wireless Application Protocol,
URL: Uniform Resource Locator,
PSS: Packet-switched Streaming Service,
SMIL: Synchronized Multimedia Integration Language,
UA: User Agent,
VAS: Value Added Service,
URI: Uniform Resource Identifier.

For the purposes of supporting multimedia messaging, the term multimedia network or network shall be considered to include the mobile operator's network and any functionality which may exist outside the mobile operator's network, e.g. fixed, internet and multimedia technologies etc., and the support provided by that functionality for multimedia messaging.

According to a first aspect, the disclosure relates to a method for providing a multimedia message service (MMS) from a server or relay to a user agent in a multimedia network, the method comprising: determining a video content characteristic of a video content by the server or relay; determining display and/or decoding capabilities of the user agent; signaling options of the video content to the user agent; and providing the video content depending on the display and/or decoding capabilities and depending on an option selected via the user agent from the signaled options of the video content.

By using that new method for a delivery of a multimedia message service, in particular the new signaling between the server or relay and, the user agent interoperability is improved.

In a first possible implementation form of the method according to the first aspect, the multimedia network is a network according to 3GPP Multimedia Message Service specifications, for example according to 3GPP TS 22.140: "Technical Specification Group Services and System Aspects; Multimedia Messaging Service (MMS); Stage 1 (Release 10)"; 3GPP TS 22.140:" Technical Specification Group Core Network and Terminals; Multimedia Messaging Service (MMS); Functional description; Stage 2 (Release 6) or later versions and/or releases.

The new method according to the first implementation form enhances interoperability in networks according to 3GPP MMS standardization.

In a second possible implementation form of the method according to the first aspect as such or according to the first implementation form of the first aspect, the server or relay is an MMS Server/Relay B according to 3GPP Multimedia Message Service specification, e.g. according to 3GPP TS 22.140:" Technical Specification Group Core Network and Terminals; Multimedia Messaging Service (MMS); Functional description; Stage 2 (Release 6) or a later version and/or release; wherein the user agent is an MMS User Agent B according to 3GPP Multimedia Message Service specification, e.g. 3GPP TS 22.140:" Technical Specification Group Core Network and Terminals; Multimedia Messaging Service (MMS); Functional description; Stage 2 (Release 6) or a later version and/or release; and wherein the video content is an MMS video content according to 3GPP Multimedia Message Service specification.

The new method can be applied to MMS Server/Relay B and MMS User Agent B according to 3GPP Multimedia Message Service specification. Only a small enhancement in message protocol is required which is transparent to legacy terminals.

In a third possible implementation form of the method according to the first aspect as such or according to any of the preceding implementation forms of the first aspect, the signaling options of a video content to the user agent comprises signaling all possible options of the video content to the user agent.

The user can thus choose between available options signaled to the user agent.

In a fourth possible implementation form of the method according to the first aspect as such or according to any of the preceding implementation forms of the first aspect, the options of the video content comprise one of the following: 2D, 3D, both thereof and others.

The server or relay can perform the adaptation of the 3D video file to encode it as a 2D content for legacy devices, or transcoded into a supported 3D format for devices supporting the method according to the fourth implementation form.

In a fifth possible implementation form of the method according to the first aspect as such or according to any of the preceding implementation forms of the first aspect, the video content characteristic is determined based on external metadata.

When the video content characteristic is determined based on external metadata no decoding is required to get the video content characteristic.

In a sixth possible implementation form of the method according to the fifth implementation form of the first aspect, the external metadata comprises a presentation type message field indicating 3D frame packing format of the 3D video bitstream.

The 3D frame packing format of the 3D video bitstream can be transported by using available signaling protocols, only insignificant changes are required. Thus, implementation is computational efficient.

In a seventh possible implementation form of the method according to the sixth implementation form of the first aspect, the 3D frame packing format of the 3D video bitstream comprise one of the following formats: side-by-side, top-bottom, time-interleaved.

By introducing these formats, the server is not required to decode the video content to obtain the video content characteristic.

In an eighth possible implementation form of the method according to the first aspect as such or according to any of the preceding implementation forms of the first aspect, the determining display and/or decoding capabilities comprises determining the display and/or decoding capabilities based on profiling information of the user agent, in particular based on UAProf information according to Open Mobile Alliance specification.

New vocabulary to the UAProf, i.e. extension of the PSS vocabulary allows MMS Server/Relay B to correctly perform content adaptation to the appropriate post-decoder capabilities of a 3D capable device.

In a ninth possible implementation form of the method according to the first aspect as such or according to any of the preceding implementation forms of the first aspect, the signaling options of a video content to the user agent is provided from the server or relay, in particular by using an M-NOTIFICATION.IND message according to an Open Mobile Alliance specification, e.g. according to the "Multimedia Messaging Service Encapsulation Protocol".

The enhanced message M-NOTIFICATION.IND can be applied to MMS Server/Relay B and MMS User Agent B according to 3GPP Multimedia Message Service specification. For legacy terminals, the new signaling options are transparent, thereby not influencing their operational mode.

In a tenth possible implementation form of the method according to the first aspect as such or according to any of the preceding implementation forms of the first aspect, the method comprises: informing the user about the options of the video content signaled to the user agent.

The user thus can give feedback about the desired options. This improves quality of experience.

In an eleventh possible implementation form of the method according to the tenth implementation form of the first aspect, the method comprises: indicating a selected option from the options of the video content from the user agent to the server or relay, in particular by using a header field of a GET REQUEST message according to HTTP standard, e.g. according to IETF RFC 2616: "Hypertext Transfer Protocol—HTTP/1.1" or a later version.

The new method is further compliant to HTTP standardization.

In a twelfth possible implementation form of the method according to the eleventh implementation form of the first aspect, the method comprises: redirecting the user agent to a terminal supporting the selected option, in particular by using a REDIRECT message according to an HTTP standard, e.g. according to IETF RFC 2616: "Hypertext Transfer Protocol—HTTP/1.1" or a later version.

The redirecting is only performed for devices according to the twelfth implementation form; redirection is transparent for legacy devices. Thus interoperability is improved for devices according to the twelfth implementation form and operation is not influenced for legacy devices.

In a thirteenth possible implementation form of the method according to any of the implementation forms of the first aspect or of the first aspect as such, wherein the method further comprises prior to the providing of the video content: displaying by or via the user agent the signaled options to a user, and selecting by the user an option from the signaled options via the user agent.

In a fourteenth possible implementation form of the method according to any of the implementation forms of the first aspect or of the first aspect as such, wherein the video content is a 3D video.

According to a second aspect, the disclosure relates to a User Agent device, in particular MMS User Agent B device according to 3GPP Multimedia Message Service specification, comprising a processing circuit configured for determining display and/or decoding capabilities of the user agent device; receiving options of a video content signaled by a server or relay, in particular by an MMS Server/Relay B device according to 3GPP Multimedia Message Service specification; and providing the video content depending on the display and/or decoding capabilities and on the options of the video content according to preferences of a user.

User Agent Devices applying the new method for delivery of 3GPP Multimedia Message Service, in particular the new signaling between the MMS Server/Relay B and the MMS User Agent B can improve their interoperability in an MMS network. Multiple alternative choices or options of the MMS 3D content, e.g. 2D, 3D, both, etc. are provided to the MMS User Agent B before the content adaptation is performed. The content adaptation is not restricted to the UAProf information but also takes into account the end user preferences. Moreover, by applying new signaling information about the post-decoder requirements of 3D video content included in an MMS, interoperability is improved.

According to a third aspect, the disclosure relates to a Server or relay device, in particular MMS Server/Relay B device according to 3GPP Multimedia Message Service specification, comprising a processing circuit configured for determining a video content characteristic; signaling options of a video content to a user agent device, in particular to an MMS User Agent B device according to 3GPP Multimedia Message Service specification; and providing the video content depending on display and/or decoding capabilities of the user agent device and depending on the options of the video content according to preferences of a user.

Server or relay devices can similarly improve their interoperability in an MMS network as User Agent Devices mentioned above.

The methods described herein may be implemented as software in a Digital Signal Processor (DSP), in a microcontroller or in any other side-processor or as hardware circuit within an application specific integrated circuit (ASIC).

The disclosure can be implemented in digital electronic circuitry, or in computer hardware, firmware, software, or in combinations thereof.

BRIEF DESCRIPTION OF THE DRAWINGS

Further embodiments of the disclosure will be described with respect to the following figures, in which.

DETAILED DESCRIPTION OF EMBODIMENTS OF THE INVENTION

Figure 1:
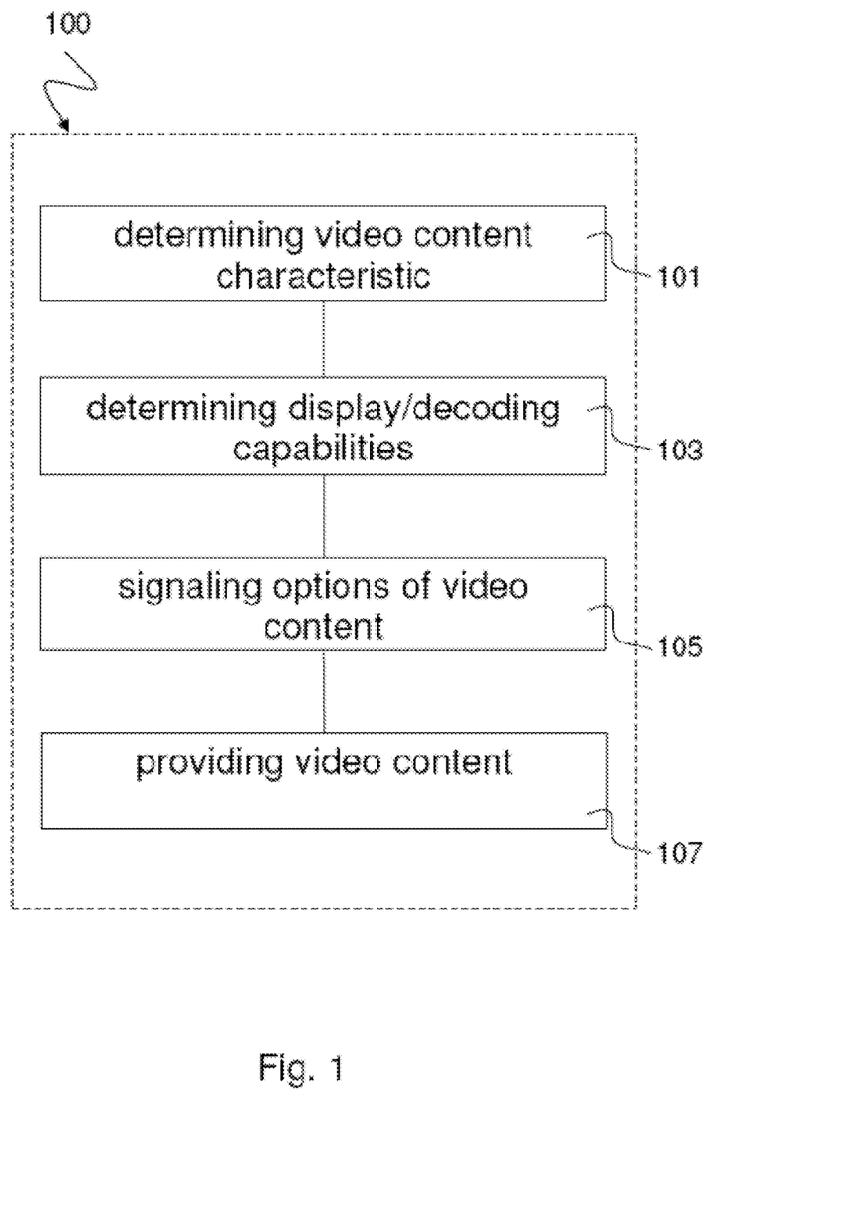
FIG. 1 shows a schematic diagram of a method for providing a multimedia message service according to an implementation form.

FIG. 1 shows a schematic diagram of a method 100 for providing a multimedia message service according to an implementation form.

The method 100 provides a multimedia message service from a server or relay to a user agent in a multimedia network. The method 100 comprises determining 101 a video content characteristic by the server or relay. The method 100 comprises determining 103 display and/or decoding capabilities of the user agent. The method 100 comprises signaling 105 options of a video content to the user agent. The method 100 comprises providing 107 the video content depending on the display and/or decoding capabilities and on the options of the video content according to preferences of a user.

The server or relay may correspond to the MMS Server/Relay B 835 as described with respect to FIG. 8. The user agent may correspond to the MMS User Agent B 831 as described with respect to FIG. 8. The signaling 105 options of a video content to the user agent may be performed by using an M-Notification-ind message 211 as illustrated with respect to FIG. 2, with the M-Notification-ind message 211 illustrated in FIG. 2 being extended by an additional option field comprising the options. The server or relay may correspond to the MMS Server/Relay B 201 depicted in FIG. 2 and the user agent may correspond to the MMS User Agent B 203 depicted in FIG. 2 where MMS Server/Relay B 201 and MMS User Agent B 203 are configured to provide and receive this additional option field. The user can choose between the signaled available options of the video content depending on the display and/or decoding capabilities of the user agent. According to the user's preferences, the video content will be delivered.

Figure 2:
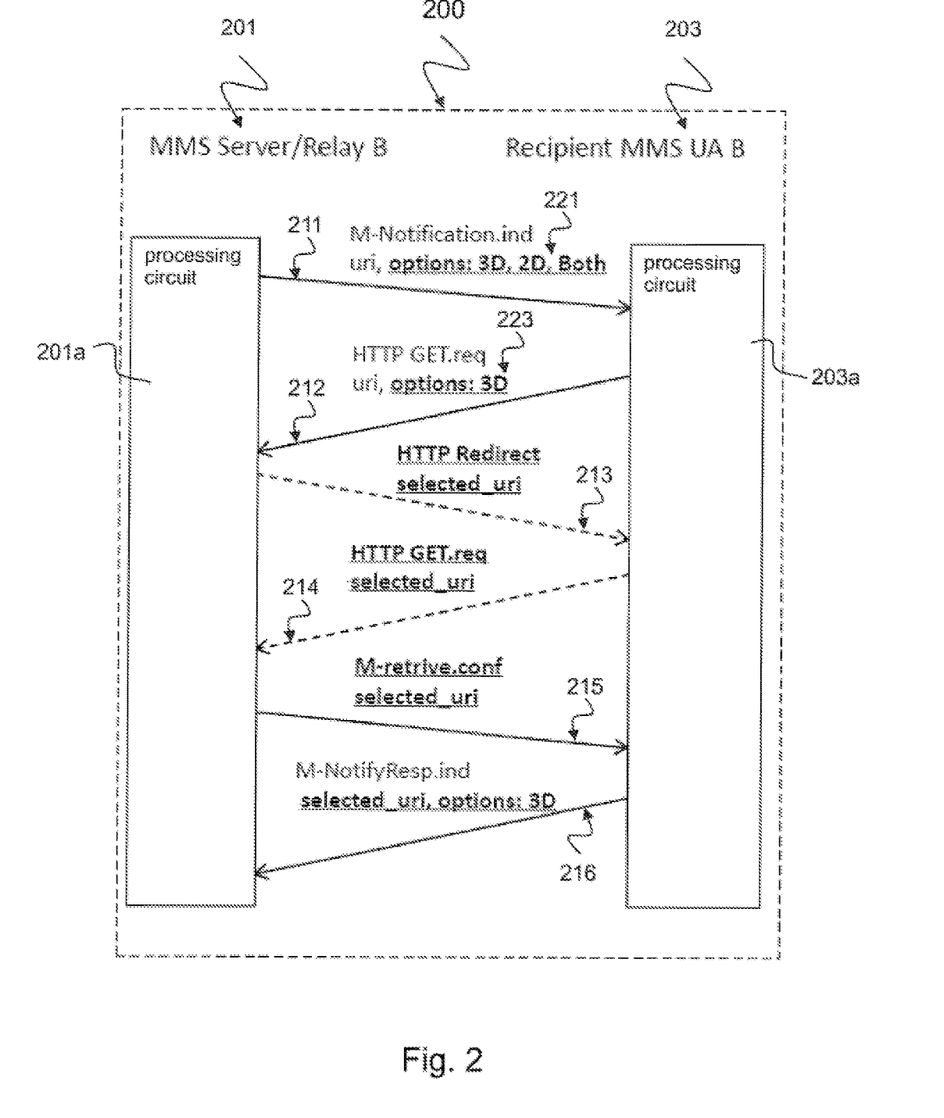
FIG. 2 shows a schematic diagram of a message protocol 200 between a server or relay device and a user agent device according to an implementation form.

FIG. 2 shows a schematic diagram of a message protocol 200 between a server or relay device 201 and a user agent device 203 according to an implementation form. The basic message protocol corresponds to the message protocol as described with respect to FIG. 10. That is, the M-Notification.ind message 211 without additional options field corresponds to the M-Notification.ind message 1011 depicted in FIG. 10, the HTTP Get.req message 212 without additional options field corresponds to the HTTP Get.req message 1012 depicted in FIG. 10, the M-retrieve.conf message 215 without the selected URI field corresponds to the M-retrieve.conf message 1015 depicted in FIG. 10 and the M-NotifyResp.ind message 216 without selected URI field and without additional options field corresponds to the M-NotifyResp.ind message 1016 depicted in FIG. 10.

The new method 200 for delivery of 3GPP Multimedia Message Service as depicted in FIG. 2 introduces an additional step where information that it is possible to choose different options 221 of the MMS content encoding are provided by an MMS Server/Relay B 201 to an MMS User Agent B 203 in an M-Notification.ind message 211. A new option header field for the M-Notification.ind PDU 211 is defined as described below. The procedure is presented in FIG. 2. First, MMS Server/Relay B 201 issues a notification 211 with an URI of the 3D video to the MMS User Agent B 203. Additionally, a new 'options' field 221 in the M-Notification.ind PDU 211 is provided. By that field a supported terminal is informed that it can decide and indicate if it wants 3D or 2D content or both versions or a different 3D supported decoding/display format. The 'options' field 221 is ignored by legacy MMS User Agents and content is fetched using the provided URI in the standard way by legacy terminals.

MMS User Agents that support the new header filed issue a GET request 212 to MMS Server/Relay B 201 with a new 'option' header field 221 indicating which encoding method the user chooses, that means according to the preference of the user. The 'options' field in the GET request 212 issued by MMS User Agent B 203 can be specified as new request header field according to RFC 2616 (http://www.ietf.org/rfc/rfc2616.txt). In case a supported terminal includes the new 'options' header field in the GET request 212, then the MMS Server/Relay B 201 acts accordingly and responds to the MMS User Agent B 203 with redirect message 213 indicating the new selected_uri. Thereafter, MMS User Agent B issues a Get.req message 214 with the new selected_uri. After the MMS User Agent B 203 is redirected to the selected_uri it starts to fetch MMS content in the standard way but by using the selected_uri and the chosen options field 223.

Figure 3:
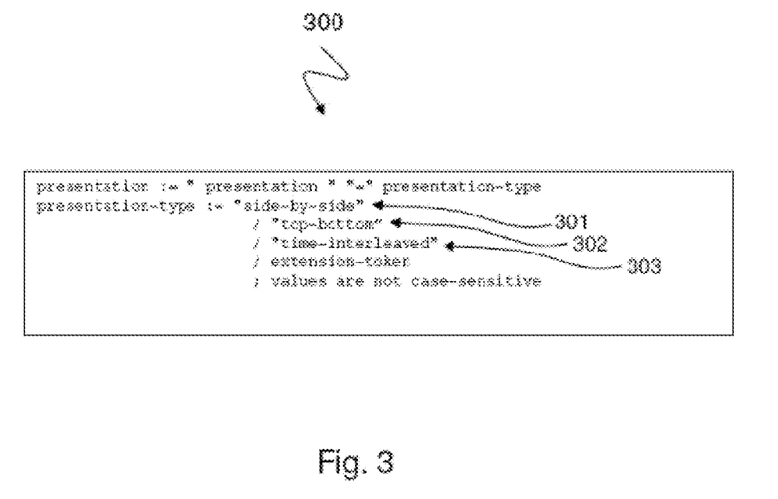
FIG. 3 shows a schematic diagram of a presentation type message field indicating 3D frame packing format of the 3D video bitstream according to an implementation form.

FIG. 3 shows a schematic diagram of a presentation type message field 300 indicating 3D frame packing format of the 3D video bitstream according to an implementation form.

In MMS specification, frame packing format is indicated in a Supplemental Enhancement Information (SEI) message. Therefore, MMS Server/Relay must perform additional processing to acquire the information that the received content is in 3D. The additional processing requires a decoding step. In the implementation form depicted in FIG. 3, post-decoder signaling information is provided about the 3D video in a MIME multipart format. The presentation type message field indicating 3D frame packing format of the 3D video bitstream comprises different possible presentation types, i.e. signaling information of the types "side-by-side" 301, "top-bottom" 302, time-interleaved" 303, etc.

Figure 4:
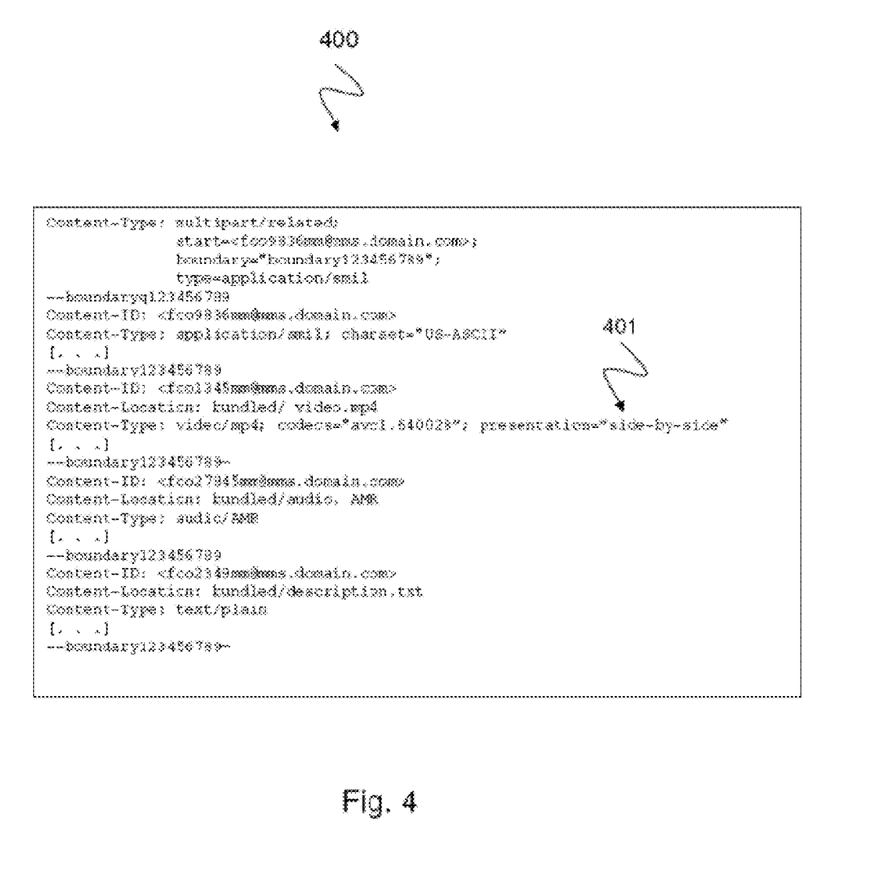
FIG. 4 shows a schematic diagram of MMS signaling information comprising presentation type information according to an implementation form.

FIG. 4 shows a schematic diagram of MMS signaling information 400 comprising presentation type information according to an implementation form.

The MMS comprises the new defined 'presentation-type' information as illustrated in FIG. 4. MMS Servers/Relays that recognize the new signaling information are able to identify the 3D content and its encoding form without the need for a decoding the bitstream. The MMS signaling information 400 may correspond to the MMS signaling information as depicted in FIG. 9 but the video content 901 depicted in FIG. 9 is enhanced by the additional presentation type information 401 which is here of type "side-by-side" Of course, this additional presentation type information 401 can be of any other type defined in the presentation type message field 300 illustrated in FIG. 3, e.g. top-bottom, time-interleaved, etc.

Figure 5:
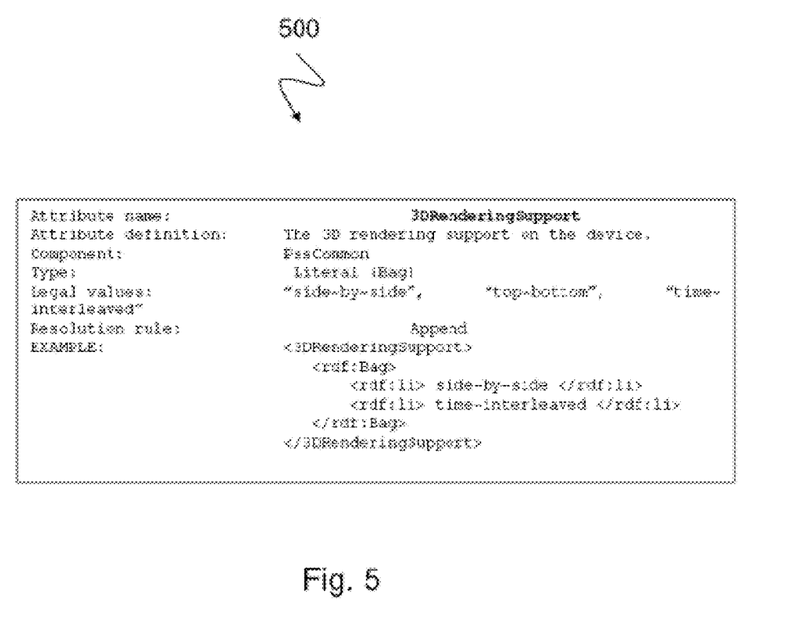
FIG. 5 shows a schematic diagram of profiling information of a user agent according to an implementation form.

FIG. 5 shows a schematic diagram of profiling information 500 of a user agent according to an implementation form. New Vocabulary in UAProf indicating the rendering capabilities of the device are introduced. FIG. 5 shows an exemplary definition of such new vocabulary. The new vocabulary provides a new attribute named as "3DRenderingSupport". Its legal values are "side-by-side", "top-bottom" and "time-interleaved".

Based on the post-decoder signaling and the recipient capabilities indicated in UAProf or acquired during capability negotiation of recipient MMS User Agent B and an MMS Server/Relay B, the MMS Server/Relay B performs the adaptation of the 3D video file to encode it as a 2D content for legacy devices, or transcoded into a supported 3D format for devices providing the new Vocabulary in UAProf.

The Server/Relay B and the MMS Server/Relay B may correspond to the devices 835, 831 depicted in FIG. 8 or to the devices 1001 and 1003 depicted in FIG. 10 when being enhanced for providing the new Vocabulary in UAProf.

From the foregoing, it will be apparent to those skilled in the art that a variety of methods, systems, computer programs on recording media, and the like, are provided.

The present disclosure also supports a computer program product including computer executable code or computer executable instructions that, when executed, causes at least one computer to execute the performing and computing steps described herein.

The present disclosure also supports a system configured to execute the performing and computing steps described herein.

Many alternatives, modifications, and variations will be apparent to those skilled in the art in light of the above teachings. Of course, those skilled in the art readily recognize that there are numerous applications of the disclosure beyond those described herein. While the present disclosure has been described with reference to one or more particular embodiments, those skilled in the art recognize that many changes may be made thereto without departing from the spirit and scope of the present disclosure. It is therefore to be understood that within the scope of the appended claims and their equivalents, the disclosures may be practiced otherwise than as specifically described herein.

Embodiments of the invention can be implemented, in particular, in UMTS (Universal Mobile Telecommunication Systems) and LTE (Long Term Evolution) networks.

The invention claimed is:

1. A method, implemented by a server or a relay, for providing a multimedia message service to a user agent in a network, the method comprising:
   determining a plurality of content options for a video content, wherein the video content comprises an MMS three dimension (3D) video content according to a Third Generation Partnership Project (3GPP) Multimedia Message Service (MMS) specification;
   signaling the content options for the video content to the user agent, wherein the signaled content options comprise at least one of the following: two dimensions (2D) or three dimensions (3D);
   receiving from the user agent selection of one of the content options;
   adapting the 3D video content to the user agent based on display and/or decoding capabilities of the user agent and the selected content option, wherein adapting the 3D video content comprises encoding the 3D video content as a 2D video content; and
   providing the adapted video content to the user agent.

2. The method of claim 1, wherein the network is a network according to the Third Generation Partnership Project (3GPP) Multimedia Message Service specification.

3. The method of claim 1, wherein the server or relay is a multimedia message service (MMS) Server/Relay B according to the Third Generation Partnership Project (3GPP) Multimedia Message Service specification, and wherein the user agent is an MMS User Agent B according to the 3GPP Multimedia Message Service specification.

4. The method of claim 1, wherein the signaling content options for the video content to the user agent comprises signaling all possible options for the video content to the user agent.

5. The method of claim 1, further comprising:
   determining a video content characteristic of the video content based on external metadata.

6. The method of claim 5, wherein the external metadata comprises a presentation type message field indicating a 3D frame packing format of a 3D video bitstream.

7. The method of claim 6, wherein the 3D frame packing format of the 3D video bitstream comprises one of the following formats: side-by-side, top-bottom, and time-interleaved, the method further comprising:
   signaling the 3D frame packing format to the user agent.

8. The method of claim 1, further comprising:
   determining at least one of the display or the decoding capabilities of the user agent based on profiling information of the user agent.

9. The method of claim 1, wherein the options for the video content to the user agent are signaled by the server or relay using an M-NOTIFICATION.IND message according to an Open Mobile Alliance specification.

10. The method of claim 1, further comprising informing a user about the options for the video content signaled to the user agent.

11. The method of claim 10, wherein receiving from the user agent selection of one of the content options comprises:
receiving a GET REQUEST message from the user agent and obtaining the selected option from a header field of the GET REQUEST message according to HTTP standardization.

12. The method of claim 11, wherein providing the adapted video content to the user agent comprises redirecting the user agent to a terminal supporting the selected option using a REDIRECT message according to a HTTP standard.

13. The method of claim 1, further comprising:
determining at least one of the display or the decoding capabilities of the user agent based on UAProf information according to an Open Mobile Alliance specification.

14. A server or relay device comprising:
a memory storage comprising executable instructions; and
one or more processors in communication with the memory storage, wherein the one or more processors execute the instructions to:
determine a plurality of content options for a video content, wherein the video content comprises an MMS three dimension (3D) video content according to a Third Generation Partnership Project (3GPP) Multimedia Message Service (MMS) specification;
signal the content options for the video content to a user agent device, wherein the signaled content options comprise at least one of the following: two dimensions (2D) or three dimensions (3D);
receive from the user agent device selection of one of the content options;
adapt the video content to the user agent device based on the selected content option and one or more of display or decoding capabilities of the user agent device, wherein adapting the video content comprises encoding the 3D video content as a 2D video content; and
provide the adapted video content to the user agent device.

15. The server or relay device of claim 14, wherein the server or relay device is a multimedia message service (MMS) Server/Relay B device according to the 3GPP Multimedia Message Service specification, and wherein the user agent device is an MMS User Agent B device according to the 3GPP Multimedia Message Service specification.

16. The server or relay device of claim 14, wherein the options for the video content to the user agent are signaled by the server or relay using an M-NOTIFICATION.IND message according to an Open Mobile Alliance specification.

17. The server or relay device of claim 14, wherein the one or more processors is further configured to inform a user about the options for the video content signaled to the user agent device.

18. The server or relay device of claim 14, wherein the one or more processors is further configured to determine at least one of the display or the decoding capabilities of the user agent device based on UAProf information according to an Open Mobile Alliance specification.

19. A non-transitory, computer readable medium storing instructions that, when executed by one or more processors, cause the one or more processors to perform the following:
determine a plurality of content options for a video content, wherein the video content comprises an MMS three dimension (3D) video content according to a Third Generation Partnership Project (3GPP) Multimedia Message Service (MMS) specification;
signal the content options for the video content to a user agent in a network, wherein the signaled content options comprise at least one of the following: two dimensions (2D) or three dimensions (3D);
receive from the user agent selection of one of the content options;
adapt the 3D video content to the user agent based on display and/or decoding capabilities of the user agent and the selected content option, wherein adapting the 3D video content comprises encoding the 3D video content as a 2D video content; and
provide the adapted video content to the user agent.

20. The non-transitory, computer readable medium of claim 19, wherein the stored instructions, when executed by the one or more processors cause the one or more processors to further perform the following:
determine a video content characteristic of the video content based on external metadata.

21. The non-transitory, computer readable medium of claim 19, wherein the stored instructions, when executed by the one or more processors cause the one or more processors to further perform the following:
determine at least one of the display or the decoding capabilities of the user agent based on profiling information of the user agent.

22. The non-transitory, computer readable medium of claim 19, wherein the stored instructions, when executed by the one or more processors cause the one or more processors to further perform the following:
inform a user about the options for the video content signaled to the user agent.

23. The non-transitory, computer readable medium of claim 19, wherein the stored instructions, when executed by the one or more processors cause the one or more processors to further perform the following:
determine at least one of the display or the decoding capabilities of the user agent based on UAProf information according to an Open Mobile Alliance specification.

* * * * *